US007952895B2

(12) United States Patent
Matthews

(10) Patent No.: US 7,952,895 B2
(45) Date of Patent: May 31, 2011

(54) METHOD AND APPARATUS FOR IMPLEMENTING AN UNREGULATED DORMANT MODE IN A POWER CONVERTER

(75) Inventor: David Michael Hugh Matthews, Windsor (GB)

(73) Assignee: Power Integrations, Inc., San Jose, CA (US)

( * ) Notice: Subject to any disclaimer, the term of this patent is extended or adjusted under 35 U.S.C. 154(b) by 411 days.

(21) Appl. No.: 12/129,474

(22) Filed: May 29, 2008

(65) Prior Publication Data

US 2009/0295346 A1 Dec. 3, 2009

(51) Int. Cl.
*H02M 3/335* (2006.01)
*G05F 1/575* (2006.01)
(52) U.S. Cl. .................. 363/21.15; 363/21.16; 323/284
(58) Field of Classification Search ............ 363/16, 363/20, 21.01, 21.12, 21.15, 21.16, 21.17, 363/97; 323/284, 285
See application file for complete search history.

(56) References Cited

U.S. PATENT DOCUMENTS

| | | | |
|---|---|---|---|
| 4,510,562 A | 4/1985 | Maeba | |
| 4,733,135 A | 3/1988 | Hanlet | |
| 4,742,441 A | 5/1988 | Akerson | |
| 5,014,178 A | 5/1991 | Balakrishnan | |
| 5,285,369 A | 2/1994 | Balakrishnan | |
| 5,313,381 A | 5/1994 | Balakrishnan | |
| 5,481,178 A | 1/1996 | Wilcox et al. | |
| 5,513,088 A | 4/1996 | Williamson | |
| 5,731,694 A | 3/1998 | Wilcox et al. | |
| 5,994,885 A | 11/1999 | Wilcox et al. | |
| 6,198,637 B1 * | 3/2001 | Hosotani et al. ............... 363/19 |
| 6,212,079 B1 | 4/2001 | Balakrishnan et al. | |
| 6,226,190 B1 | 5/2001 | Balakrishnan et al. | |
| 6,275,018 B1 | 8/2001 | Telefus et al. | |
| 6,297,623 B1 | 10/2001 | Balakrishnan et al. | |
| 6,304,066 B1 | 10/2001 | Wilcox et al. | |
| 6,339,314 B1 | 1/2002 | Bruning | |
| 6,414,863 B1 | 7/2002 | Bayer et al. | |
| 6,480,401 B2 | 11/2002 | Tang | |

(Continued)

OTHER PUBLICATIONS

"ACT353", Active-Semi, Inc., Rev. PrA, Aug. 19, 2007, pp. 2-9.

(Continued)

*Primary Examiner* — Gary L Laxton
(74) *Attorney, Agent, or Firm* — Blakely Sokoloff Taylor & Zafman LLP

(57) ABSTRACT

A control circuit for use in a power converter with an unregulated dormant mode of operation is disclosed. In one aspect a power converter includes a drive signal generator coupled to generate a drive signal to control switching of a power switch to be coupled to the control circuit to regulate a flow of energy to a power converter output in response to an energy requirement of one or more loads to be coupled to the power converter output. An unregulated dormant mode control circuit is included and is coupled to render dormant the drive signal generator thereby ceasing the regulation of the flow of energy to the power converter output by the drive signal generator when the energy requirement of the one or more loads falls below a threshold. The drive signal generator is coupled to be unresponsive to changes in the energy requirements of the one or more loads when dormant. The unregulated dormant mode control circuit is coupled to power up the drive signal generator after a period of time has elapsed. The drive signal generator is coupled to again be responsive to changes in the energy requirement of the one or more loads after the period of time has elapsed.

36 Claims, 9 Drawing Sheets

U.S. PATENT DOCUMENTS

| | | |
|---|---|---|
| 6,519,166 B1 | 2/2003 | Li |
| 6,525,514 B1 | 2/2003 | Balakrishnan et al. |
| 6,529,354 B1 | 3/2003 | Shteynberg et al. |
| 6,580,258 B2 | 6/2003 | Wilcox et al. |
| 6,661,679 B1 | 12/2003 | Yang et al. |
| 7,106,602 B2 | 9/2006 | Mabanta et al. |
| 7,272,025 B2 | 9/2007 | Hawley |
| 7,301,319 B2 | 11/2007 | Balakrishnan et al. |
| 7,313,004 B1 | 12/2007 | Yang et al. |
| 7,321,223 B2 | 1/2008 | Hachiya |
| 7,332,900 B2 | 2/2008 | Currell |
| 7,345,462 B2 | 3/2008 | Balakrishnan et al. |
| 7,345,894 B2 | 3/2008 | Sawtell et al. |
| 7,348,766 B2 | 3/2008 | Hachiya et al. |
| 7,369,418 B2 | 5/2008 | Balakrishnan |
| 7,411,137 B2 | 8/2008 | Sandberg et al. |
| 7,411,317 B2 | 8/2008 | Liu |
| 7,755,342 B2 | 7/2010 | Chen et al. |
| 7,843,179 B2 | 11/2010 | Hasegawa et al. |
| 2007/0070558 A1 | 3/2007 | Liu |
| 2008/0007240 A1 | 1/2008 | Hawley |
| 2009/0153123 A1 | 6/2009 | Kraft |
| 2009/0154206 A1 | 6/2009 | Fouquet et al. |
| 2009/0289612 A1 | 11/2009 | Hojo et al. |
| 2009/0295346 A1 | 12/2009 | Matthews |
| 2010/0194198 A1 | 8/2010 | Djenguerian et al. |
| 2010/0195355 A1 | 8/2010 | Zheng |
| 2010/0208500 A1 | 8/2010 | Yan et al. |
| 2010/0225293 A1 | 9/2010 | Wang et al. |
| 2010/0302812 A1 | 12/2010 | Moon et al. |

OTHER PUBLICATIONS

"AP3700E Low Power PWM Controller for Off-line Battery Charger", BCD Semiconductor Manufacturing Ltd., Rev. 1.0, Dec. 2007, pp. 1-12.

"AP3706 Primary Side Control IC for Off-line Battery Chargers", BCD Semiconductor Manufacturing Ltd., Rev. 1.0, Feb. 2008, pp. 1-12.

"C2472, C2473 and C2474 Datasheet: RDFC Controllers for Offline Applications", Cambridge Semiconductor Ltd., Version DS-1423-0709C, Sep. 26, 2007, pp. 1-18.

"FSDM0465RE, FSDM0565RE, FSDM07652RE—Green Mode Fairchild Power Switch (FPSTm)", Fairchild Semiconductor Corp., Rev. 1.0.2, Oct. 2007, pp. 1-20.

"FSEZ1216—Primary-Side-Regulation PWM Controller Integrated Power MOSFET", Fairchild Semiconductor Corp., Rev. 0.1, Mar. 2008, pp. 1-12.

"FSQ0565R, FSQ0765R—Green-Mode Fairchild Power Switch (FPS™) for Quasi-Resonant Operation—Low EMI and High Efficiency", Fairchild Semiconductor Corp., Rev. 1.0.0, Oct. 2007, pp. 1-22.

"ICE3B0365J, ICE3B0565J, ICE3B1565J—CoolSET™ -F3 (Jitter Version): Off-Line SMPS Current Mode Controller with Integrated 650V Startup Cell/Depletion CoolMOS™ ", Infineon Technologies AG, Version 2.3, May 8, 2006, pp. 1-26.

"ICE3A(B)0365/0565/1065/1565; ICE3A(B)2065/2565; ICE3A0565Z/2065Z; ICE3A(B)2065I/3065I/3565I; ICE3A(B)5065I/5565I; ICE3A(B)2065P/3065P/3565P; ICE3A(B)5065P/5565P—CoolSET™ F3: Off-Line SMPS Current Mode Controller with Integrated 650V Startup Cell/Depletion CoolMOS™", Infineon Technologies AG, Version 2.0, Aug. 24, 2005, pp. 1-31.

"iW1689—Low-Power Off-line Digital PWM Controller", iWatt, Inc., 2005, pp. 1-20.

"iW1690— Low-Power Off-line Digital PWM Controller", iWatt, Inc., Rev. 1.1, Jan. 14, 2008, pp. 1-12.

"iW1692—Low-Power Off-line Digital PWM Controller", iWatt, Inc., Version MK-4008-B, Nov. 20, 2007, pp. 1-18.

"L6566B—Multi-Mode Controller for SMPS", STMicroelectronics, Rev. 1, Aug. 2007, pp. 1-51.

"LD7576/76H/76J/76K—Green-Mode PWM Controller with High-Voltage Start-Up Circuit and Adjustable OLP Delay Time", Leadtrend Technology Corp., Rev. 3, Dec. 5, 2007, pp. 1-20.

"LT3825—Isolated No-Opto Synchronous Flyback Controller with Wide Input Supply Range", Linear Technology Corp., Rev. A, 2007, pp. 1-32.

"NCP1015—Self-Supplied Monolithic Switcher for Low Standby-Power Offline SMPS",ON Semiconductor®: Semiconductor Components Industries, LLC, Rev. 0, Jul. 2007, pp. 1-20.

"NCP1027—High-Voltage Switcher for Medium Power Offline SMPS Featuring Low Standby Power", ON Semiconductor®: Semiconductor Components Industries, LLC, Rev. 2, Jun. 2006, pp. 1-30.

"NCP1028—High-Voltage Switcher for Medium Power Offline SMPS Featuring Low Standby Power", ON Semiconductor®: Semiconductor Components Industries, LLC, Rev. 0, Jan. 2007, pp. 1-29.

"NCP1030, NCP1031—Low Power PWM Controller with On-Chip Power Switch and Start-Up Circuits for 48 V Telecom Systems", ON Semiconductor®: Semiconductor Components Industries, LLC, Rev. 2, Sep. 2003, pp. 1-18.

"NCP1201—PWM Current-Mode Controller for Universal Off-Line Supplies Featuring Low Standby Power with Fault Protection Modes", ON Semiconductor®: Semiconductor Components Industries, LLC, Rev. 0, Jul. 2003, pp. 1-18.

"NCP1230—Low-Standby Power High Performance PWM Controller", ON Semiconductor®: Semiconductor Components Industries, LLC, Rev. 1, Jun. 2004, pp. 1-22.

"NCP1337—PWM Current-Mode Controller for Free Running Quasi-Resonant Operation", ON Semiconductor®: Semiconductor Components Industries, LLC, Rev. P0, Oct. 2005, pp. 1-16.

"OB2358—Current Mode PWM Power Switch", On-Bright Electronics Corp., Version OB_DOC_DS_5800, pp. 1-10.

"SG6741—Highly-Integrated Green-Mode PWM Controller", System General Corp., Version 1.1, Nov. 17, 2006, pp. 1-13.

"SG6859A—Low-Cost, Green-Mode PWM Controller for Flyback Converters", Fairchild Semiconductor Corp., Rev. 1.0.0, Mar. 2008, pp. 1-12.

"SG6860—Low-Cost, Green-Mode PWM Controller for Flyback Converters", Fairchild Semiconductor Corp., Rev. 1.0.1, Mar. 2008, pp. 1-11.

"SGP100—Primary-Side-Control PWM Controller", System General Corp., Version 1.0, Sep. 7, 2006, pp. 1-14.

Van den Broek, V., "STARplug™—Efficient Low Power Supply with the TEA152x", Philips Semiconductors: Philips Electronics N.V., Version 1.0, Application Note AN00055, Sep. 2000, pp. 1-42.

"News Release: Realizing Low Power Consumption (100mW max) at No Load—STR-A6200 Series—IC's for Switching Mode Power Supplies (SMPS)", STR-A6200 Datasheet, Sanken Electric Co., Ltd., Mar. 23, 2005, pp. 1-5.

"TEA1541—SMPS Control IC with Synchronization Function", Philips Semiconductors: Koninklijke Philips Electronics N.V., Aug. 11, 2003, pp. 1-19.

"TEA1654—GreenChip™ II SMPS Control IC", Philips Semiconductors: Koninklijke Philips Electronics N.V., May 12, 2003, pp. 1-24.

"THX203H—Switching Power Controller IC", THX Micro-Electronics, Sep. 1, 2006, pp. 1-42 (English translation attached).

"VIPer12ADIP-E, VIPer12AS-E—Low Power Off-Line SMPS Primary Switcher", STMicroelectronics, Rev. 1, Jan. 2006, pp. 1-21.

"VIPER17—Off-line High Voltage Converters", STMicroelectronics, Rev. 2, Feb. 2008, pp. 1-31.

"VIPer22ADIP-E, VIPer22AS-E—Low Power OFF-Line SMPS Primary Switcher", STMicroelectronics, Rev. 1, Feb. 2006, pp. 1-20.

"VIPer53EDIP-E, VIPer53ESP-E—OFF-Line Primary Switch", STMicroelectronics, Rev. 1, Jan. 2006, pp. 1-31.

"RD-166—Load Detecting Power Supply," National Semiconductor, Nov. 2008, pp. 1-16.

U.S. Appl. No. 12/366,574, filed Feb. 5, 2009, Djenguerian et al.
U.S. Appl. No. 12/961,241, filed Dec. 6, 2010, Bailey
Office Action mailed Nov. 9, 2010, U.S. Appl. No. 12/366,574, filed Feb. 5, 2009 (25 pages).

* cited by examiner

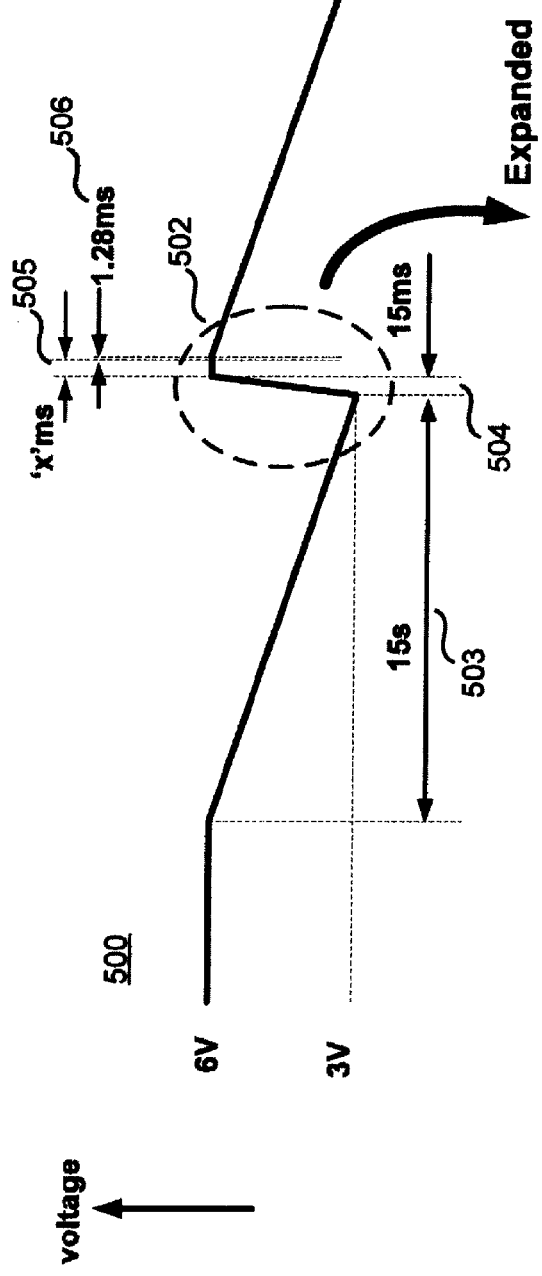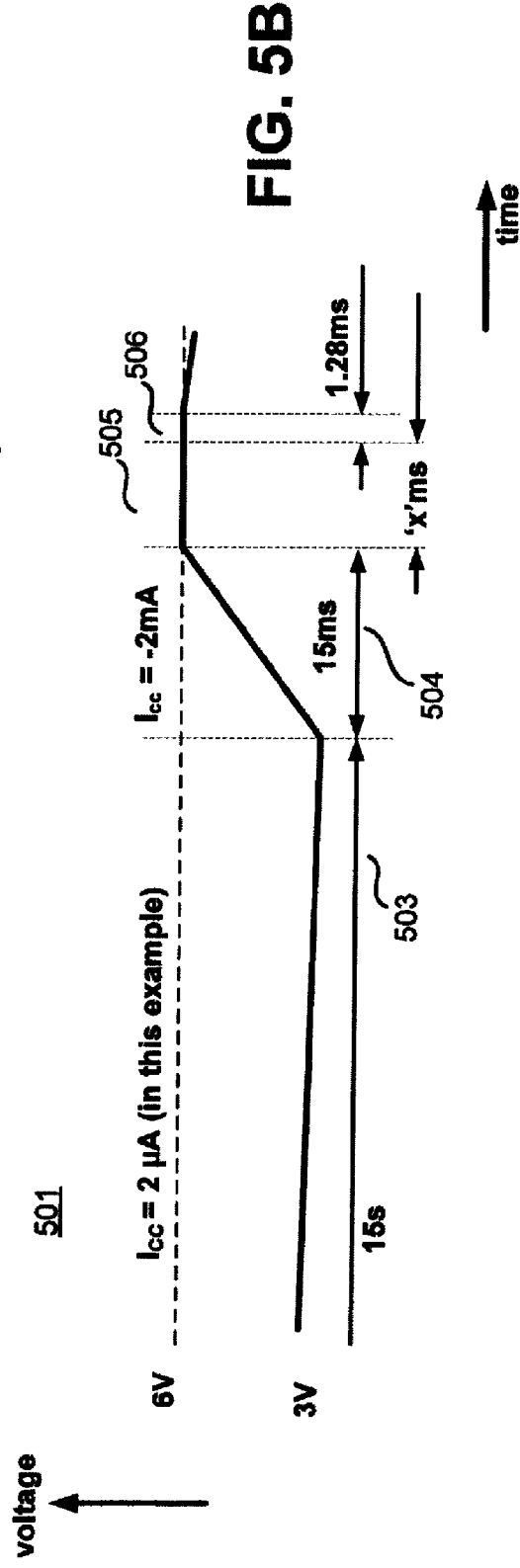

METHOD AND APPARATUS FOR IMPLEMENTING AN UNREGULATED DORMANT MODE IN A POWER CONVERTER

BACKGROUND INFORMATION

1. Field of the Disclosure

The present invention relates generally to control circuits that regulate the delivery of energy in a switched mode power converter and, more specifically, the present invention relates to control circuits that reduce the energy consumption of switched mode power converters under light or no load conditions by use of an unregulated dormant mode of operation.

2. Background

Power converter control circuits may be used for a multitude of purposes and applications. There is a demand for control circuit functionality that can reduce the energy consumption of the power converter. In particular, there is specific demand for control circuits that reduce the energy consumption of power converters under conditions of light or no load. This demand comes from the fact that in some applications of power converters there is little or no requirement for energy delivery at all for long periods of time. One example of such an application is in AC-DC chargers for cellular telephones. The AC-DC charger is often left connected to the AC mains outlet in the home or office, even when the cellular phone itself is completely disconnected from the output cable of the AC-DC charger. Such a condition is often referred to as a no-load condition. Furthermore in applications such as cellular telephones and digital still cameras and the like, the unit being powered by the output of the AC-DC charger shuts down once the battery internal to the unit is fully charged. Under these conditions the energy requirement of the unit falls dramatically and is therefore a very light load condition for the AC-DC charger. This condition is often referred to as a standby or sleep mode and again can exist for long periods. There is therefore also demand for the AC-DC charger to operate with high efficiency or in other words with the lowest possible energy consumption under these very light load standby or sleep mode conditions.

Existing control circuits for switched mode power converters typically reduce the energy consumption of the power converter by reducing the switching frequency of a power switch coupled to the control circuit, to reduce a type of energy loss called switching losses. During this time of reduced switching frequency, the control circuits remain active by maintaining a power converter output voltage such that the unit to be powered (the cellular telephone handset or digital still camera for example) can receive energy as soon as it is connected to the AC-DC charger output or as soon as it comes out of sleep/standby mode and demands more energy.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 5A and 5B shows example waveforms that in one example are from a control circuit with the block diagram of FIG. 4.

DETAILED DESCRIPTION

Figure 1:
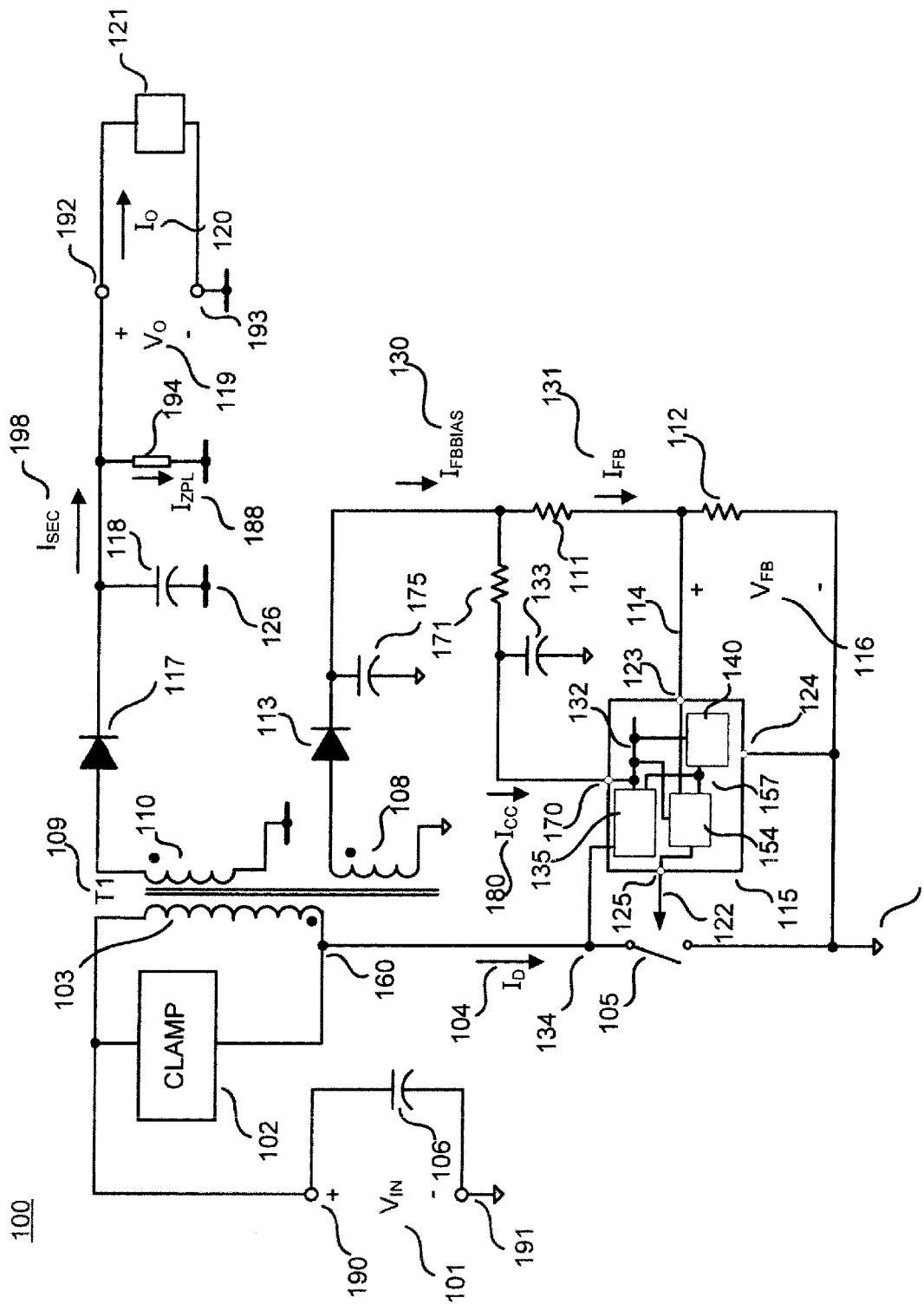
FIG. 1 is a schematic illustrating generally an example flyback power converter employing an example of a control circuit that reduces the energy consumption of the power converter under light or no load conditions by use of an unregulated dormant mode of operation in accordance with the teachings of the present invention.

Methods and apparatuses for implementing a control circuit for reducing the energy consumption of a power converter under light or no load conditions by use of an unregulated dormant mode of operation are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

A control circuit for reducing the energy consumption of a power converter under light or no load conditions by use of an unregulated dormant mode of operation will now be described. Examples of the present invention involve methods and apparatuses to implement an unregulated dormant mode of operation to reduce the energy consumption of a power converter under light or no load conditions. The following description will detail a number of example control circuits used in a variety of power converter circuits that regulate energy flow from an input of the power converter to the output of the power converter under normal operating conditions, which could be for example when a cellular telephone is connected to the output of the power converter and is charging its battery. The flow of energy from input to the output of the power converter can also be described in terms of energy flow through an energy transfer element, which may include a transformer within the power converter but could be a simple inductor in some power converter configurations. The description will detail how the example control circuits described transition to a mode of operation where energy flow from input to output of the power converter is no longer regulated when the output of the power converter is identified as being in a no-load or very light load condition, for example when the cellular telephone is physically disconnected from the output of the AC-DC charger in which the control circuit is used. Under these conditions, the transfer of energy from input to output of the power converter is substantially reduced to zero for a period of time that is programmed by the user of the control circuit or is preprogrammed using a timer circuit inside the control circuit itself. During this period of time the circuit is in the unregulated dormant mode of operation referred to in the title of this disclosure. During this unregulated dormant mode time period, the power consumption of the control circuit itself is reduced as much as possible to conserve energy. The description will detail how, after this unregulated dormant mode period of operation, the control circuit will restart and again regulate energy flow from the input of the power converter to the output of the power converter. If however the very light load or no-load condition is still present, the control circuit will again detect this and again initiate a period of unregulated dormant mode operation.

To illustrate, FIG. 1 shows generally a schematic of a power converter 100, also sometimes referred to as a power supply, employing a control circuit 115 that regulates energy flow through the energy transfer element 109. In the illustrated example, control circuit 115 includes an unregulated dormant mode control circuit 140 employed to reduce the energy consumption of the power converter 100 under light or no load conditions by use of an unregulated dormant mode of operation in accordance with the teachings of the present invention. In one example, power converter 100 is an isolated flyback converter where primary ground 107 and secondary return 126 are electrically isolated from one another. It is noted that in other examples power converter 100 could be non-isolated with primary ground 107 and secondary return 126 electrically connected together in accordance with the teachings of the present invention. Other non-isolated power converter configurations that could benefit from the teachings of the present invention could further include buck, CUK or SEPIC converters. It is further noted that in other examples, power converter 100 could have more than one output in accordance with the teachings of the present invention.

As shown in the illustrated example, a control circuit 115 includes a drive signal generator block 154, which generates a drive signal 122 that is to be coupled to drive a power switch 105. In one example, power switch 105 is a metal oxide semiconductor field effect transistor (MOSFET), a bipolar transistor or the like. Power switch 105 is coupled to the input winding 103 of energy transfer element 109, which is coupled to a DC input voltage 101 and an output power diode 117. In one example, DC input voltage 101 is the output of a rectifier circuit coupled to a source of AC voltage not shown. Capacitor 106 is coupled to power converter input terminals 190 and 191 to provide a low impedance source for switching currents flowing through first and second input terminals 190 and 191, energy transfer element 109 winding 103 and power switch 105 when the power switch 105 is in an ON state. In one example, control circuit 115 and switch 105 could form part of an integrated circuit that could be manufactured as a hybrid or monolithic integrated circuit. As shown in the depicted example, control circuit 115 is coupled to receive a feedback signal 114, which in one example is a voltage signal, but in other examples could also be a current signal, or other signal representative of a parameter of the power converter 100 output, while still benefiting from the teachings of the present invention.

When power converter 100 is first connected to the input voltage supply 101 in the illustrated example, control circuit 115 derives start up current to initiate operation of the control circuit. This is achieved by charging up an external bypass capacitor 133 coupled to bypass terminal 170. In the example of FIG. 1 this start up current is derived from the high voltage connection node 134 of power switch 105 and coupled to a regulator circuit 135 internal to control circuit 115. An output 132 from regulator circuit 135 is coupled to an external bypass capacitor 133 and is also the voltage supply rail for the circuitry internal to control circuit 115. In another example, the connection node 134 could instead be coupled to input terminal 190 or to a node internal to the structure of power switch 105 in the case that power switch 105 and control circuit 115 are integrated on a single die and/or incorporated within a single semiconductor package.

In the illustrated example, regulator circuit 135 converts the high voltage present on node 134, which in one example is typically in the range of 50 to 400V relative to primary ground 107, and regulates the maximum voltage on rail 132 to a lower voltage, which can be used to operate the control circuit 100. Initially the voltage across bypass capacitor 133 is substantially zero and the regulator circuit 135 provides current to charge up bypass capacitor 133. When the voltage on bypass capacitor 133 is sufficient for correct operation of control circuit 115, which in one example is typically in the order of 6 Volts, an internal under-voltage circuit, not shown, enables control circuit 115 to start operation, which initiates switching of power switch 105 with drive signal 122. This, in turn, initiates the flow of energy from input terminals 190 and 191 through energy transfer element 109.

Energy transfer element 109 includes input winding 103 and output winding 110 and a low voltage (which in one example is typically in the range 10 to 30V) auxiliary winding 108. The feedback signal 114 is coupled to control circuit 115 from auxiliary winding 108 through the resistor divider formed by resistors 111 and 112. In addition, when auxiliary winding capacitor 175 is sufficiently charged, the control circuit 115 receives the supply current 180 for the control circuit 115 to operate through resistor 171. In the illustrated example, deriving current from the low voltage auxiliary winding 108 in this way is more efficient than regulator circuit 135 deriving current from the high voltage node 134. As such, the operation of regulator circuit block 135 is typically disabled when supply current Icc 180 is available through resistor 171.

In one example, control circuit 115 includes a drive signal generator 154 to generate a drive signal 122, which is to be coupled to drive power switch 105 to regulate energy flow through energy transfer element 109 by regulating the frequency at which power switch 105 is switched on and off in response to the feedback signal 114. This switching frequency regulation can be achieved in a number of ways including varying the frequency of an oscillator, not shown, within control circuit 115, selectively enabling and disabling switching cycles of power switch 105 derived from a fixed frequency oscillator within control circuit 115 (often to referred to as on/off control) or varying an off time of the power switch 105 with a fixed on time of power switch 105. When switch 105 is on, energy from the capacitor 106 is transferred into the input winding 103 of the energy transfer element 109. When the switch is off, the energy stored in the input winding 103 is transferred to the output winding 110 and to auxiliary winding 108. The energy from output winding 110 is transferred to the output of the power supply 100 with a current that flows through a forward biased output power diode 117 to capacitor 118, a load 121 coupled to preload impedance 194 and the output terminals 192 and 193. Since, in this example, switching frequency is the variable used to regulate energy flow, the frequency at which the power switch 105 is switching is therefore a measure of the total energy flowing through energy transfer element 109.

In the example of FIG. 1, control circuit 115 is coupled to regulate the total energy delivered from the first and second input terminals 190 and 191 of power converter 100 through energy transfer element 109 to the power converter output terminals 192 and 193, the preload impedance 194, the control circuit supply terminal 170 and the feedback components 111 and 112 in addition to the feedback terminal 123. In an example cellular telephone charger providing a full load output power to load 121 of 3 Watts (an energy of 3 Joules per second), the energy consumed by the preload 194, control circuit 115 supply current 180 and feedback current 131 is typically less than 1% of the energy consumed by load 121. However, if output load current 120 is substantially eliminated by either physically disconnecting load 121 or when load 121 is in a standby mode of operation, the combined energy consumption of the preload 194, control circuit 115 supply current 180 and feedback current 131 can become substantially 100% of the energy flowing through energy transfer element 109.

Since, as described above, in the example of FIG. 1, switching frequency of power switch 105 is the variable used to regulate energy flow through energy transfer element 109, the switching frequency is therefore an indication of the total energy requirement or demand of the circuitry coupled to the windings 108 and 110 of energy transfer element 109. Therefore, in the illustrated example, when the switching frequency of power switch 105 falls below a threshold value, it is used as an indication that output current 120 has been reduced to substantially zero and that a no-load or very light load condition therefore exists where load 121 is requiring substantially no energy. In other words, when the energy requirements of load 121 falls below a threshold value a no-load or very light load condition has been identified.

Under these conditions, control circuit 115 in one example includes unregulated dormant mode control circuit 140, which is coupled to generate a power down/reset signal 157 coupled to render dormant the drive signal generator 154 by powering down the drive signal generator 154 for a period of time. During this period of time while the drive signal generator 154 is powered down, the drive signal generator 154 no longer generates drive signal 122 and no longer regulates the energy flow through the energy transfer element 109. In one example, the duration of the period of time for which drive signal generator 154 is powered down and the switching of power switch 105 is disabled is determined by the length of time it takes for bypass capacitor 133 to discharge from its normal operating voltage, which in one example is in the range of 5.8 to 6.4 Volts, down to a lower voltage, which in one example could be 3 Volts. During this time, output capacitor 118 also discharges through preload impedance 194 and output voltage 119 also therefore falls. Thus, in this example, bypass capacitor 133 also functions as part of a timer to determine a time period in response to the indication that output current 120 has been reduced to substantially zero and that a no-load or very light load condition therefore exists. During this time, capacitor 175 also discharges through resistors 171 and 111 and the voltage across capacitor 175 also therefore falls. It is appreciated that in another example, the duration of the period of time for which drive signal generator 154 is powered down and the switching of power switch 105 is disabled could be determined by a timer circuit comprising a capacitor external to control circuit 115 but which is not the bypass capacitor 133. In a further example, the duration of the period of time for which drive signal generator 154 is powered down and the switching of power switch 105 is disabled could be determined by a timer circuit which is entirely integrated within control circuit 115 with no need for an external capacitor for this purpose.

In order to reduce the energy consumption of the control circuit as much as possible during this time period, internal regulator circuit block 135 is also powered down in response to the power down/reset signal 157 such that substantially no current flows from node 134 through regulator circuit 135 and the energy consumed by regulator circuit block 135 is substantially zero. During this unregulated dormant mode time period where the drive signal generator 154 of control circuit 115 ceases to regulate energy flow through energy transfer element 109, control circuit 115 is unresponsive to feedback signals received at terminal 123 until the unregulated dormant mode time period has elapsed. During this unregulated dormant mode period, therefore, in addition to powering down regulator circuit block 135, substantially all other circuitry inside control circuit 115 is also powered down and disconnected from supply rail 132 in response to power down/reset signal 157. This disconnection results in reduced power consumption and can be achieved using simple semiconductor load switches as will be known to one of ordinary skill in the art.

As will be discussed in greater detail below with reference to FIG. 4, a circuit block that remains powered up in control circuit 115 is a portion of the unregulated dormant mode control circuit 140, which in one example includes an internal power up circuit block that detects when the voltage across bypass capacitor 133 falls to the 3V lower threshold. Thus, in the illustrated example, the unregulated dormant mode time period is considered to have elapsed when the voltage across bypass capacitor 133 falls to the 3V lower threshold, at which point the power up circuit block provides an internal reset signal inside the unregulated dormant mode control circuit 140 that resets the power down/reset signal 157 and reinitiates the control circuit 115 start up operation to power up the circuitry as described above with regard to when the input voltage supply 101 was first connected.

Therefore, in the illustrated example, bypass capacitor 133 is recharged when the control circuit 115 start up operation is reinitiated in response to the power down/reset signal 157. The bypass capacitor 133 is recharged using current flowing through regulator circuit 135 and when the voltage across bypass capacitor 133 again exceeds the under-voltage threshold voltage required for correct operation of the control circuit 115, which in one example is approximately 6V, drive signal generator 154 is powered up and drive signal 122 is generated to resume the switching of power switch 105. At this point, drive signal generator 154 is again responsive to feedback signals received at terminal 123 and energy again flows through energy transfer element 109 to replenish energy lost in capacitors 175 and 118. The switching frequency of power switch 105 will be high during this time. However, after the energy in capacitors 175 and 118 is replenished, if the load 121 still requires substantially no energy, the switching frequency will again fall below the threshold value, which will again cause the power down/reset signal 157 to initiate a power down, which will again cause the drive signal generator 154 in control circuit 115 to cease the regulation of energy flow through energy transfer element 109 as described above. This operation of powering down and going dormant for a period of time, followed by a start up and resumed switching period, will repeat continuously until the energy requirement of load 121 again increases such that the switching frequency of power switch is maintained above the threshold value and the control circuit 115 then regulates the flow of energy through energy transfer element continuously according to the energy required by the total load on energy transfer element windings 108 and 110.

It is appreciated that in other examples of control circuit 115, following a period of unregulated dormant mode operation, the internal reset signal inside unregulated dormant mode control circuit 140 could initiate a low power restart sequence which consumes less energy than the normal start up when input voltage supply 101 if first connected. For instance, in one example, a low power restart sequence could include recharging bypass capacitor 133 to a value above the under-voltage threshold with current flowing through regulator circuit 135 as above. However, when switching of power switch 105 is resumed, output capacitor 118 could be partially recharged only enough to simply detect whether it is being discharged at a rate that indicates that a no-load condition at the output of power converter 100 still exists, in which case the unregulated dormant mode operating period would then be repeated. It is appreciated that this low power restart functionality would offer even further reduction in energy consumption, but could result in added complexity or cost to the overall power converter. The additional cost or complexity would result from the addition of circuitry to control circuit 115 to remember the fact that it had previously been in a low power unregulated mode of operation and also circuitry to detect a discharge rate of output capacitor 118, or some other way of detecting output current, at voltage conditions below the normal regulated value of output voltage 119.

It is noted that FIG. 1 shows that auxiliary winding 108 is a non-isolated winding of energy transfer element 109. Thus, it is appreciated therefore that the benefits of the teachings of the present invention may be applied to power converters that include energy transfer elements with isolated windings, non-isolated windings and combinations thereof. Examples of non-isolated windings include non-isolated sense windings, non-isolated bias windings, non-isolated output windings and the like. It is also noted that one or more loads may be coupled to the various windings of the energy transfer element in accordance with the teachings of the present invention. Indeed, FIG. 1 shows that both preload impedance 194 and load 121 are coupled to output winding 110 in the illustrated example. It is appreciated therefore the combinations of different one or more loads may be coupled to the different combinations of the windings of an energy transfer element resulting in many different load and winding configurations that may enjoy the benefits of a power converter including an unregulated dormant mode of operation in accordance with the teachings of the present invention.

For instance, in an example in which energy transfer element 109 includes a non-isolated sense winding, one of the one or more loads may be coupled to the non-isolated sense winding. In another example, one of the one or more loads may be coupled to an isolated output winding while another one of the one or more loads may be coupled to the non-isolated sense winding. In an example that includes a non-isolated bias winding, one or more of the loads may be coupled to the non-isolated bias winding. In another example, one of the one or more loads may be coupled to an isolated output winding while another one of the one or more loads may be coupled to the non-isolated bias winding. In an example in which the energy transfer element includes a non-isolated output winding, one of the one or more loads may be a combined sensing and bias load that is coupled to the non-isolated output winding. In an example in which the energy transfer element includes an isolated output winding and a non-isolated output winding, one of the one or more loads may be coupled to the isolated output winding and another one of the one or more loads may be a load that includes a combined sensing and bias load coupled to the non-isolated output winding.

Figure 2:
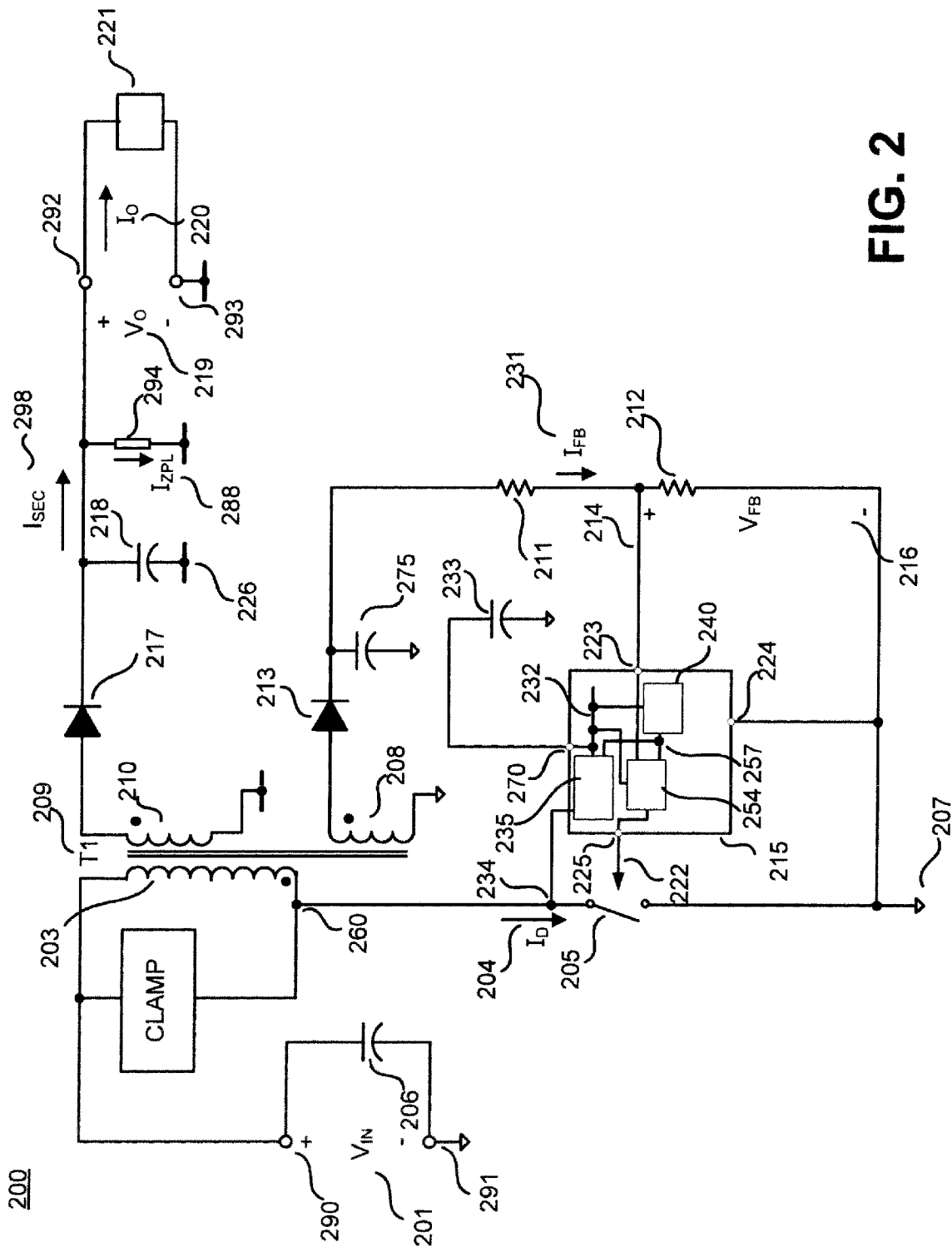
FIG. 2 is a schematic illustrating another example flyback power converter employing another example of a control circuit that reduces the energy consumption of the power converter under light or no load conditions by use of an unregulated dormant mode of operation in accordance with the teachings of the present invention.

FIG. 2 shows another example power converter circuit 200 using a control circuit 215 benefiting from the teachings of the present invention. The functionality of the power converter circuit example shares many aspects of the power converter circuit example described in FIG. 1. A difference compared to the circuit of FIG. 1 is that the resistor 171 is eliminated such that the operating current of control circuit 215 under normal operating conditions is derived entirely through regulator circuit 235. Energy transfer element winding 208 is therefore only used as a sense winding providing a feedback voltage across capacitor 275 which generates a feedback current $I_{FB}$ 231. However, the operation when the energy required by load 221 falls below a threshold value, which in one example is detected by the switching frequency of power switch 205 falling below a threshold value, is identical to that of the circuit of FIG. 1. Under those circumstances, an unregulated dormant mode of operation is initiated where regulator circuit 235 is disabled and substantially all circuit blocks other than a portion of the unregulated dormant mode control circuit 240 are disconnected from supply rail 232 while the voltage at external bypass capacitor 233 discharges from its normal operating voltage to the power up threshold voltage detected by unregulated dormant mode control circuit 240. In the example, the bypass capacitor 233 is then recharged to its normal operating voltage level, which in one example is approximately 6 Volts, and switching of power switch 205 is restarted.

Figure 3:
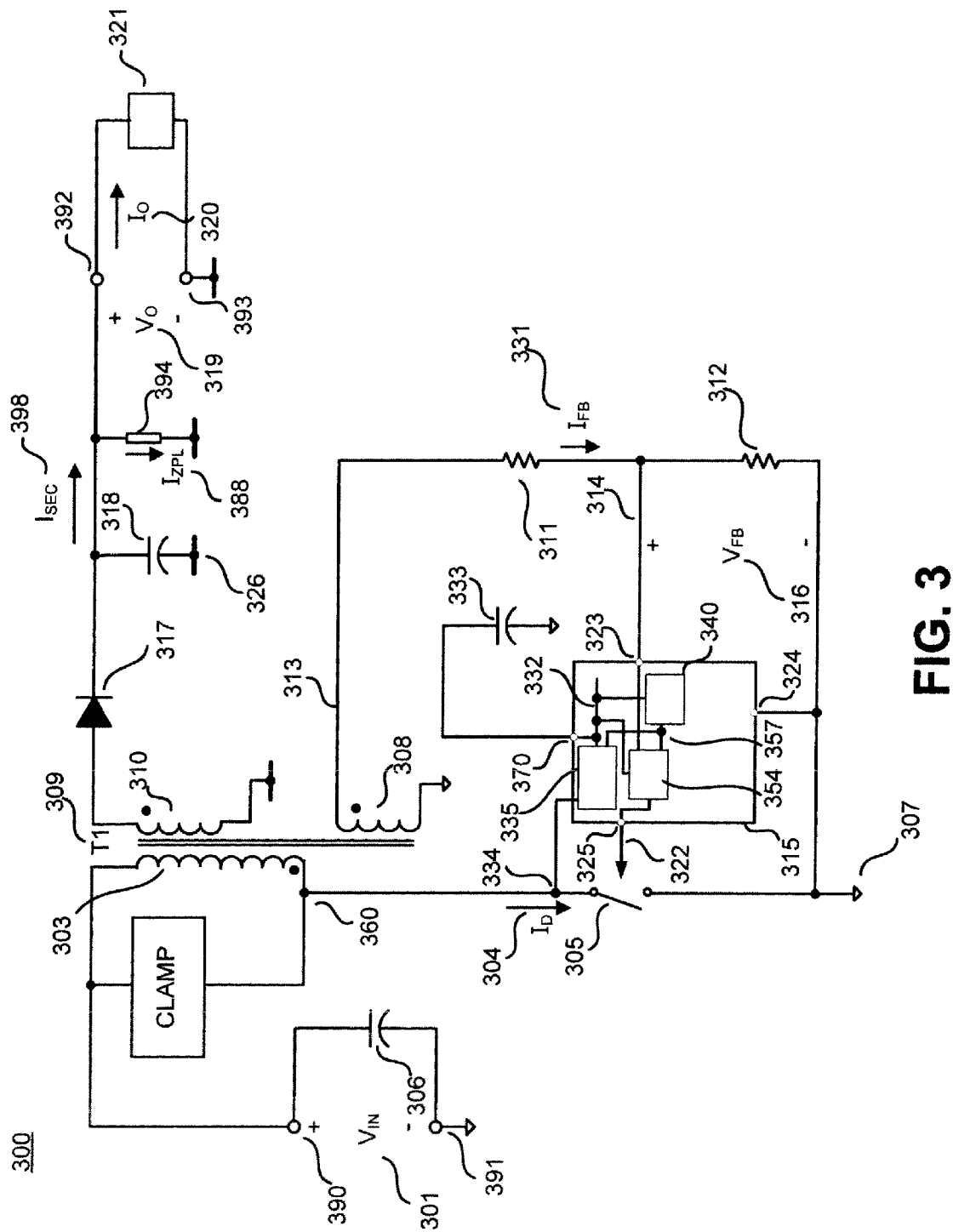
FIG. 3 is a schematic illustrating yet another example flyback power converter employing yet another example of a control circuit that reduces the energy consumption of the power converter under light or no load conditions by use of an unregulated dormant mode of operation in accordance with the teachings of the present invention.

FIG. 3 shows another example power converter circuit 300 using a control circuit 315 benefiting from the teachings of the present invention. The functionality of the example power converter 300 illustrated in FIG. 3 shares many aspects of the power converter circuit described in FIG. 2. A difference compared to the power converter circuit 200 of FIG. 2 is that the diode 213 and capacitor 275 are eliminated. In common with the power converter circuit 200 of FIG. 2, therefore, is that the operating current of control circuit 315 under normal operating conditions is derived through regulator circuit 335. Furthermore winding 308 of energy transfer element provides an AC voltage at node 313 relative to primary ground potential node 307. As a result, the feedback current $I_{FB}$ 331 has both positive and negative values during a switching cycle of the power switch 305. $I_{FB}$ 331 is a negative current during substantially all of the on time of power switch 305 and is a positive current for at least a portion of the off time of power switch 305. However, the operation when the energy required by load 321 falls below a threshold value, which in one example is detected by the switching frequency of power switch 305 falling below a threshold value, is similar to that of the example power converter circuits of FIG. 1 and FIG. 2. Under those circumstances, an unregulated dormant mode of operation is initiated, where in one example, regulator circuit 335 is disabled and substantially all circuit blocks in control circuit 315 other than a portion of the unregulated dormant mode control circuit 340 are disconnected from supply rail 332 while the external bypass capacitor 333 voltage discharges from its normal operating voltage to a power up threshold voltage detected by unregulated dormant mode control circuit 340. The bypass capacitor 333 is then recharged to its normal operating voltage level, which in one example is approximately 5.8 Volts, and switching of power switch 305 is restarted.

Figure 4:
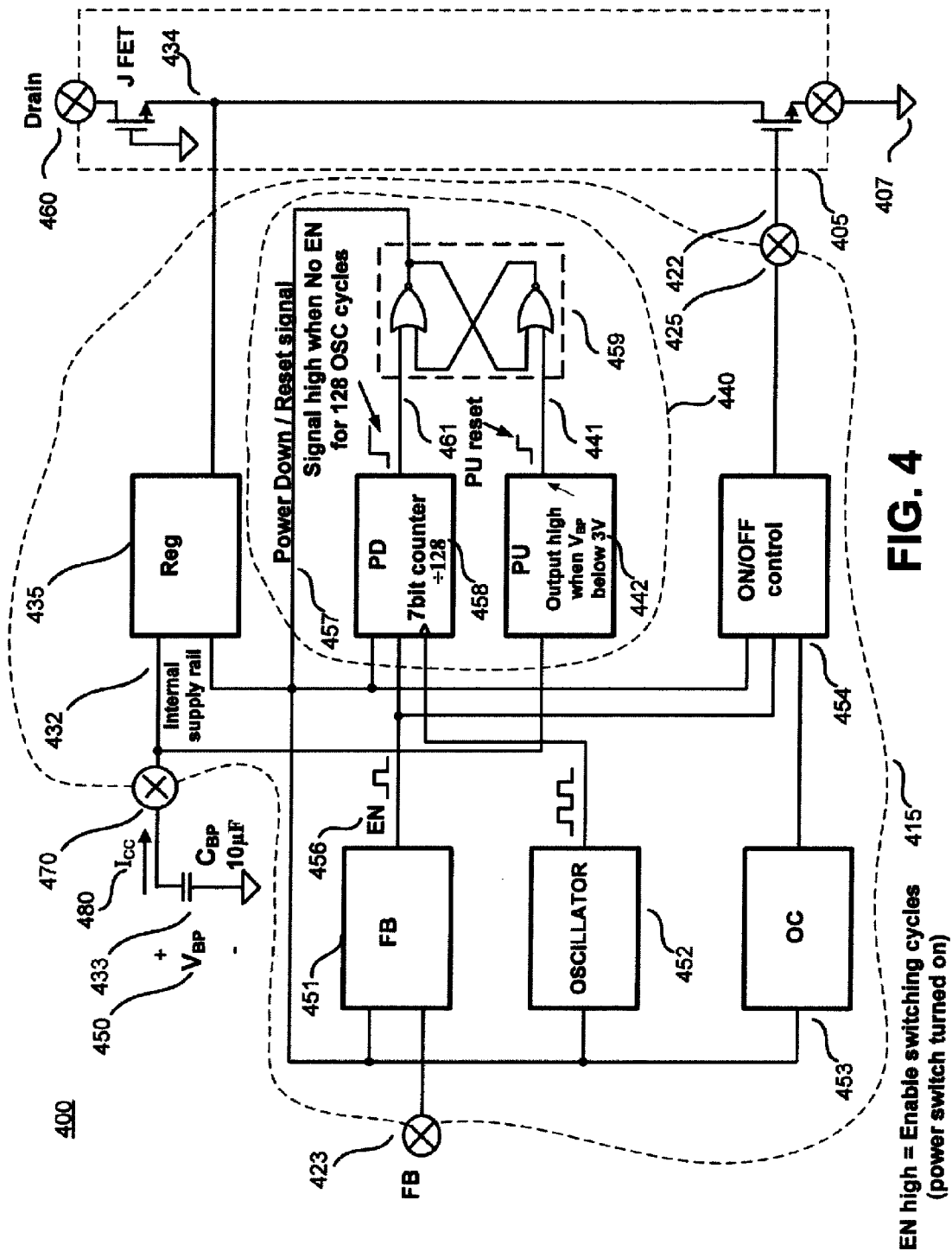
FIG. 4 is an example block diagram of a control circuit that reduces the energy consumption of a power converter under light or no load conditions in accordance with the teachings of the present invention.

FIG. 4 shows an example simplified block diagram 400 of a portion of a control circuit 415 that could be applied to any of the example control circuits 115, 215 or 315 in accordance with the teachings of the present invention. FIG. 4 still shows more details than control circuit block diagrams 115, 215 and 315 but remains a simplified diagram intended to show only the level of detail necessary for the description of the present invention. As such certain functional connections between the various internal circuit blocks, that would be visible in a detailed control circuit 415 block diagram, are not shown so as not to obscure the teachings of the present invention.

As described with reference to FIG. 1 above, the example configuration shown in FIG. 4 uses a high voltage node 434 coupled to a node internal to the structure of power switch 405. The example configuration of FIG. 4 is therefore one where the control circuit 415 and power switch 405 could be monolithically integrated on a single silicon die where this internal node of power switch 405 is available. As shown in the depicted example, node 434 is coupled to regulation circuit 435, which can have similar functionality to blocks 135, 235 and 335 as shown in FIGS. 1, 2 and/or 3, and is shown coupled to receive a power down/reset signal 457 from unregulated dormant mode control circuit 440. It is appreciated that although the combined power down/reset signal 457 is illustrated as a single connection in FIG. 4, the power down and reset signals of power down/reset signal 457 could also be separate electrical signals with separate electrical connections in another example.

In the example of FIG. 4, control circuit 415 includes a drive signal generator 454, which in the example is illustrated as including an on/off control circuit. In the illustrated example, the on/off control circuit of drive signal generator 454 is coupled to receive an EN signal 456 output from the FB block 451. The FB block 451 is coupled to receive a feedback signal at FB terminal 423. In the illustrated example, the FB block 451 generates the output EN signal 456 as low when no switching of power switch 405 is required but as high when switching of power switch 405 is required. In other examples, FB terminal 423 and FB block 451 could be adapted to receive and process a DC or AC feedback signal depending on the external circuit configurations as discussed with reference to FIGS. 1, 2 and/or 3 above.

As shown in FIG. 4, one example of the unregulated dormant mode control circuit 440 of control circuit 415 includes a power down (PD) detection block 458, power up (PU) detection block 442 and latch circuit 459 coupled as shown. When the energy requirement of the one or more loads coupled to the energy transfer element at the output of a power converter, such as for example loads 121, 221 and 331 in FIGS. 1, 2 and 3, respectively, falls below a threshold value, the internal EN signal 456 will stay low for more than 128 cycles of oscillator 452. In the illustrated example, PD detection block 458 includes a 7-bit counter, which functions as a divide-by-128 circuit. Accordingly, if the 7-bit counter of PD detection block 458 of the unregulated dormant mode control circuit 440 does not receive a high EN signal 456 for 128 oscillator cycles, the PD detection block 458 outputs a signal 461 in a logic high state and triggers the latch circuit 459 to send the power down/reset signal 457 to most of the internal circuit blocks of control circuit 415. In the illustrated example, these blocks coupled to receive the power down/reset signal 457 include feedback circuit block 451, oscillator circuit block 452, over current detect circuit block 453, which detects the current flowing through power switch 405, drive signal generator block 454 and the 7 bit counter 458. In one example, when all these blocks are powered down in response to the power down/reset signal 457, the controller 415 consumes a current, $I_{cc}$ 480, of only 2 to 5 µA.

Since regulator circuit 435 is turned off in response to the power down/reset signal 457, external bypass capacitor 433 is no longer charged through regulator circuit 435, bypass capacitor 433 will begin to discharge and the bypass voltage 450 will start to drop. In the illustrated example, the bypass voltage 450 will drop from approximately 6 volts to an internally set PU detection voltage of approximately 3 volts. As shown in the example, PU detection block 442 remains coupled to detect the bypass voltage 450 and remains active (as well as latch circuit 459) during the unregulated dormant mode. In one example, PU detection block 442 includes a comparator coupled to bypass capacitor 433 to determine when the bypass voltage 450 has fallen to the 3 volt PU threshold. When the bypass voltage 450 has dropped to the 3 volt PU threshold, the PU reset signal 441 output from PU detection block 440 goes high, which causes power down/reset signal 457 from latch circuit 459 to go high and causes regulator circuit 435 to resume charging the bypass capacitor 433.

In one example, some or all of the other internal circuit blocks of controller circuit 415 may also resume functioning as bypass capacitor 433 is recharged. The bypass capacitor 433 will be charged up to approximately 6 volts and again the PD detection block 458 will start to sense if a high EN signal 456 is present at least once every 128 oscillator cycles, and if not, the PD detection block 458 will again cause output signal 461 from 7-bit counter 458 to be low and retrigger the latch circuit 459 to cause a new shut down cycle to start.

As mentioned above, it is noted that in the specific example illustrated in FIG. 4, a control circuit 415 that utilizes an on/off control scheme to regulate the flow of energy through the energy element coupled to the power switch is shown for explanation purposes. It is appreciated that control circuit 415 may utilize other known control schemes to regulate the flow of energy and detect no load or light load conditions in order to benefit from an unregulated dormant mode operation in accordance with the teachings of the present invention.

For instance, in another example, a magnitude of the feedback signal could be sensed by FB block 451 to detect the no load or light load condition. In such an example, the magnitude of the feedback signal could be a voltage value or a current value. In this example, when FB block 451 detects a magnitude of the feedback signal received at feedback terminal 423 that indicates a no load or light load condition, FB block 451 will output a signal 456 to PD detection block to indicate the no load or light load condition. In yet another example, a no load or light load condition may be detected by detecting a low switching frequency of the drive signal 422. In one example, the switching frequency of the drive signal 422 may be detected through the FB block 451, which is coupled to receive the feedback signal. In such an example, the switching frequency of the drive signal 422 may be derived from the feedback signal received at feedback terminal 423. In another example, PD detection block 458 could be coupled to receive the drive signal 422 to detect the low switching frequency condition of drive signal 422 to detect the no load or light load condition.

FIGS. 5A and 5B show example voltage waveforms, which in one example apply to the bypass voltage 450 at bypass capacitor 433 of FIG. 4 described above. FIG. 5B shows a waveform 501 that is an expanded view of region 502 from waveform 500 of FIG. 5A. In the example, the times shown in FIGS. 5A and 5B assume a bypass capacitor 433 value of 10 µF, an oscillator 452 frequency of 100 kHz and a current consumption ($I_{cc}$ 480) of 2 µA during the unregulated dormant mode period 503. In addition it is assumed that regulator circuit 435 charges bypass capacitor 433 with 2 mA when recharging bypass capacitor 433 from 3 to 6 V during period 504. Period 505 is of an undetermined value 'x' milliseconds since this is the period taken to recharge the output capacitor, such as for example capacitor 118, 218 or 318 and other capacitance coupled to auxiliary energy transfer element windings, such as for example capacitors 175 and 275. Period 505 is therefore a function of the choice of these capacitors, but in typical examples could be in the range of 5-20 milliseconds. Period 506 is the time it takes the 100 kHz oscillator to count through 128 cycles before again recognizing in the example shown, that the energy requirement of the load is below a threshold value and the control circuit again starts a period of unregulated dormant mode operation in accordance with the teachings of the present invention.

Figure 6:
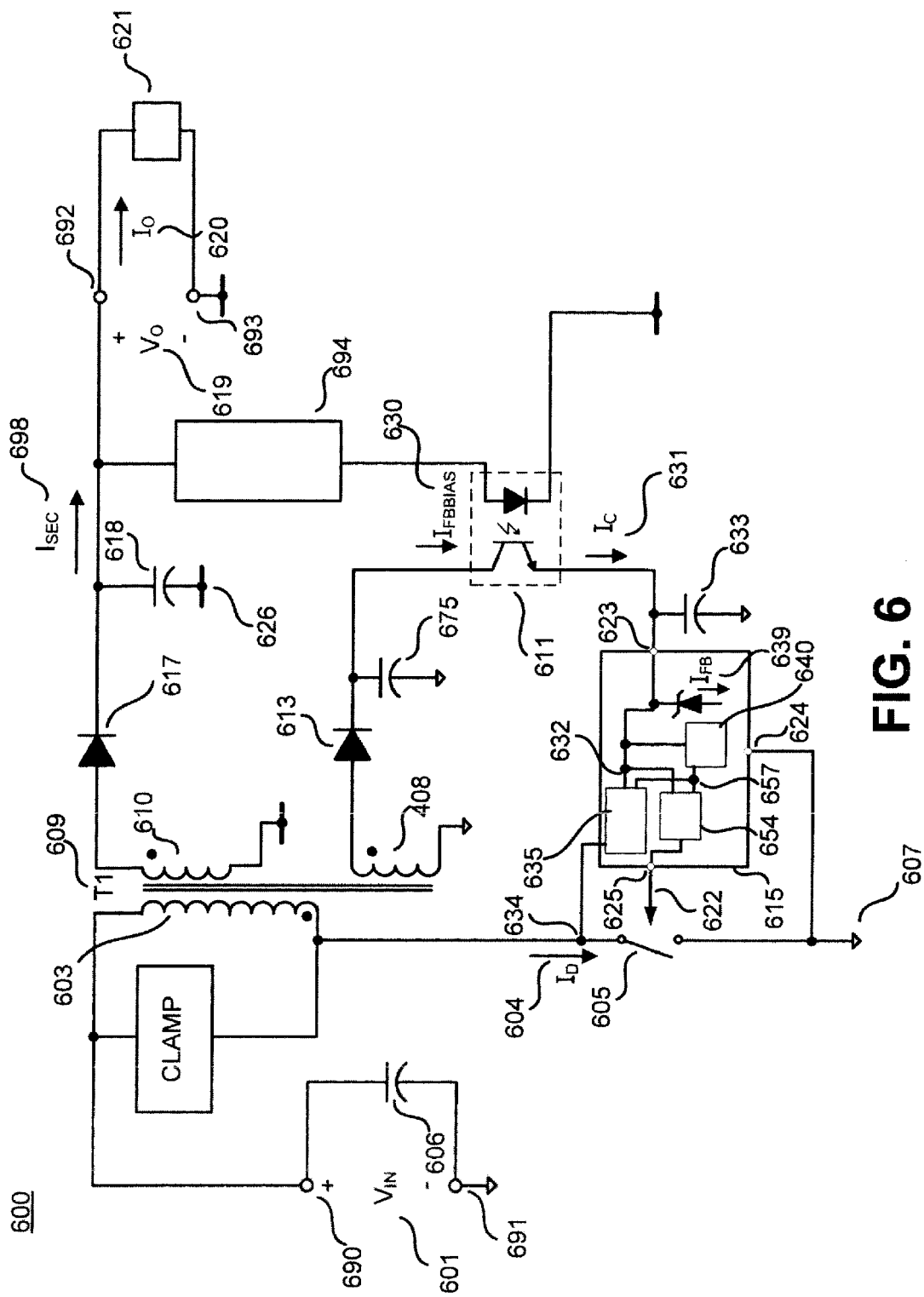
FIG. 6 is a schematic illustrating still another example flyback power converter employing still another example of a control circuit that reduces the energy consumption of the power converter under light or no load conditions by use of an unregulated dormant mode of operation in accordance with the teachings of the present invention.

FIG. 6 shows another example power converter 600 benefiting from the teachings of the present invention. As shown, the example circuit of FIG. 6 shares many aspects with those of FIGS. 1, 2 and/or 3 discussed above. A difference, however, includes that the circuit of FIG. 6 employs an optocoupler 611 and secondary feedback circuit block 694 to generate a feedback signal 639. In the example case of control circuit 615, current 631 is a combined feedback current and supply current to the control circuit 615 as used for example by the TOPSwitch family of integrated circuits manufactured by Power Integrations, Inc., of San Jose, Calif.

In the example of control circuit 615, therefore, the value of external bypass capacitor 633 determines the unregulated dormant mode time period. The variable used to detect when the energy required by the load circuit 621 has fallen below a threshold value to initiate the unregulated dormant mode of operation can also be the switching frequency of the power switch 605. However, in the example of control circuit 615, the magnitude of the feedback signal, such as the $I_C$ 631 feedback signal can also be used to detect when the energy required by the load circuit 621 has fallen below a threshold value to initiate the unregulated dormant mode of operation, as will be discussed with reference to FIG. 8. The magnitude of the feedback signal could be the current value of the $I_C$ 631 current, or in another example, the magnitude could be a voltage value responsive to the $I_C$ 631 current.

Figure 7:
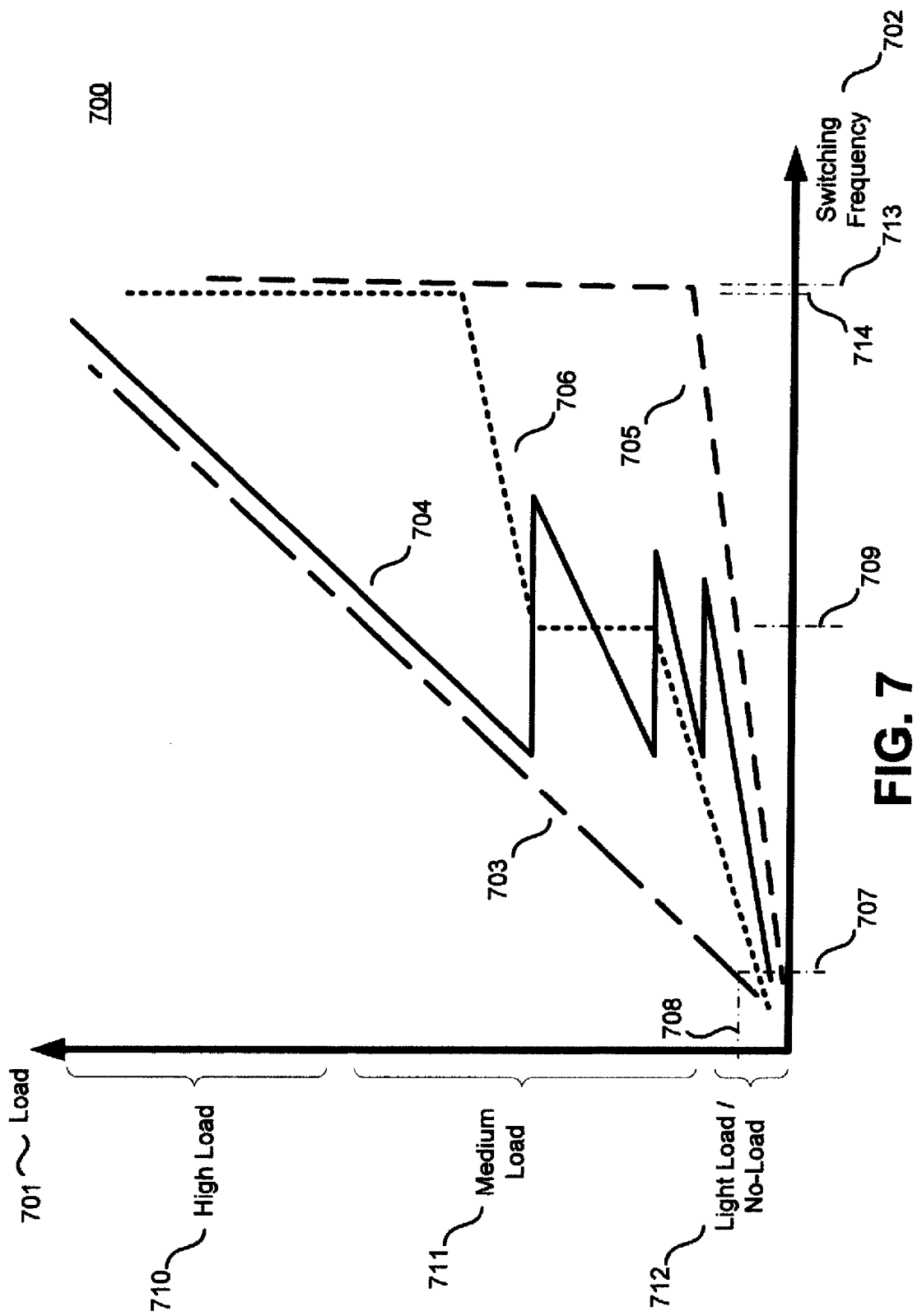
FIG. 7 is a graph showing typical switching frequency versus load characteristics of various control circuits that reduce the energy consumption of power converters under light or no load conditions.

FIG. 7 shows a few example load versus switching frequency characteristics of control circuits that could benefit from the example teachings of the present invention. Characteristic 703 is typical of simple on/off control or variable frequency control schemes discussed earlier, where load and switching frequency are linearly related. Examples of control circuits using this type of control scheme are TinySwitch, LinkSwitch-LP, LinkSwitch-TN and LinkSwitch-XT, all manufactured by Power Integrations, Inc., of San Jose, Calif.

In the case of example characteristic 703, operation in the light load/no-load condition 712 region can for example be detected when the switching frequency falls below threshold value 707 indicating that the load has fallen below threshold value 708. Characteristic 704 is typical of an on/off control circuit with multiple power switch over current threshold levels and a state machine to determine which over current threshold to use in each load condition. Examples of control circuits using this type of control scheme are TinySwitch-II, TinySwitch-III, PeakSwitch and LinkSwitch-II, all of which are manufactured by Power Integrations, Inc., of San Jose, Calif. Characteristic 705 is typical of a PWM control circuit characteristic where operation in high load condition 710 and/or medium load condition 711 is typically with fixed average switching frequency 713, but where average switching frequency is reduced in the light and no-load region 712. Examples of control circuits using this type of control scheme are TOPSwitch-FX and TOPSwitch-GX, both of which are manufactured by Power Integrations, Inc., of San Jose, Calif. Characteristic 706 is typical of a PWM control circuit with more complex control schemes where operation in high load condition 710 and a portion of medium load condition 711 is typically with fixed average switching frequency 714, but where the average switching frequency is reduced in other portions of medium load condition 711 and light load/no-load condition 712 regions. An example of a control circuit using this type of control scheme is TOPSwitch-HX manufactured by Power Integrations, Inc., of San Jose, Calif.

Regardless of the control scheme used, a common factor is that switching frequency is reduced at light load/no-load conditions and can therefore be used as a way to detect a light or no-load condition on the output of a power converter. This is true of numerous other control circuits using these or other light load operating schemes, such as burst mode, where the average switching frequency is also reduced under light load/no-load conditions.

Figure 8:
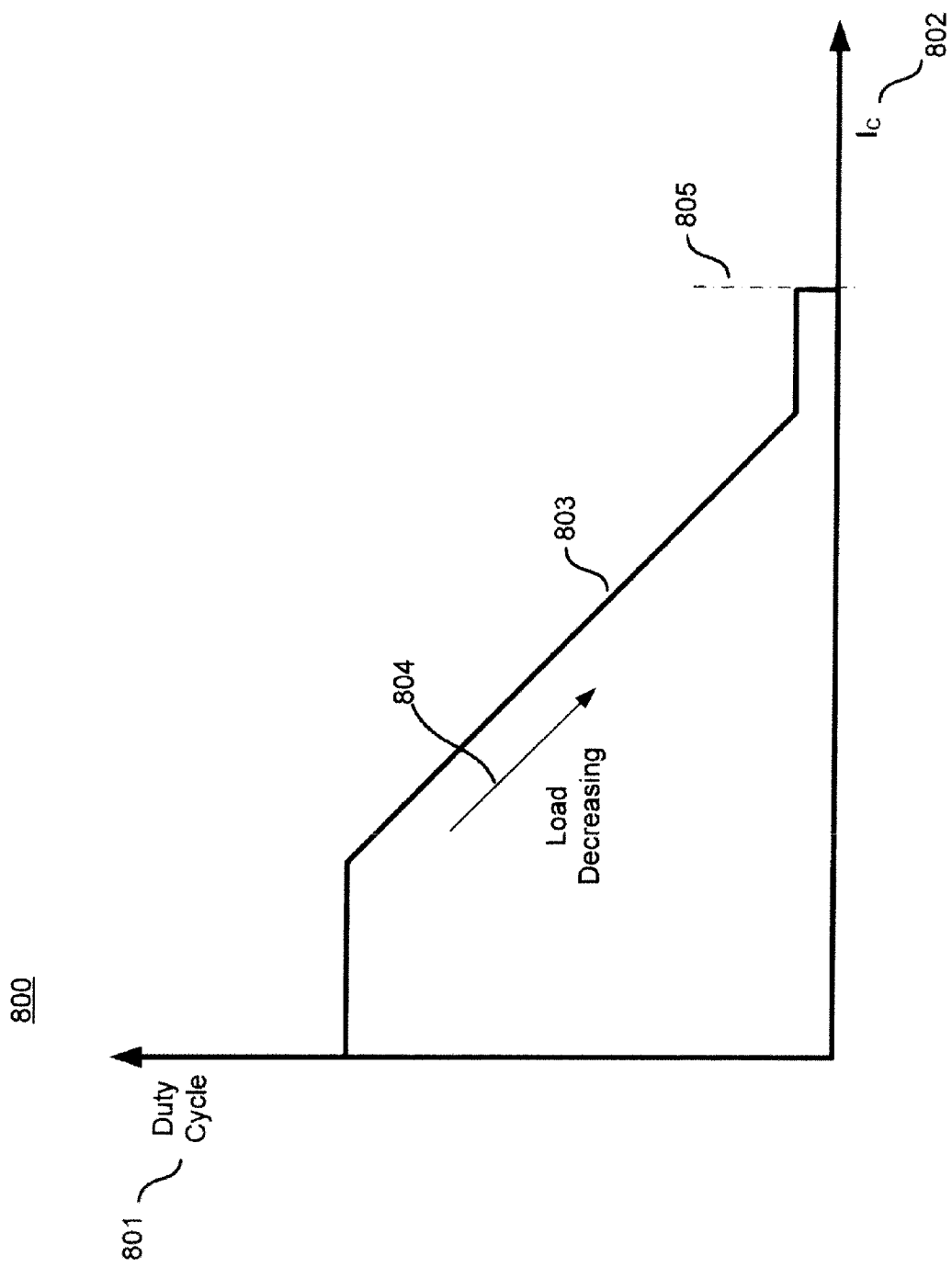
FIG. 8 is a graph showing an example control characteristic of a control circuit that reduces the energy consumption of a power converter under light or no load conditions in accordance with the teachings of the present invention

FIG. 8 shows an example of a duty cycle 801 versus $I_C$ 802 current characteristic, which in one example could apply to the circuit configuration described above with reference to FIG. 6. The example characteristic of FIG. 8 illustrates that the detection of a light load/no-load condition is not limited to detecting a switching frequency of a power switch. As shown in the example characteristic of FIG. 8, a reduction in load on the output of the power converter is indicated by an increase in Ic 802 current as indicated by label 804. Detection of a threshold Ic current 805, where the duty cycle falls to zero, can therefore be used as an indication that the energy requirements of a load at the output of the power converter have fallen below a threshold value and could therefore be used to initiate a period of unregulated dormant mode operation in accordance with the teachings of the present invention. It is appreciated that with other control schemes, there are other ways that may be employed to indicate a light load/no-load condition and used therefore to initiate an unregulated dormant mode of operation in accordance with the teachings of the present invention.

Figure 9:
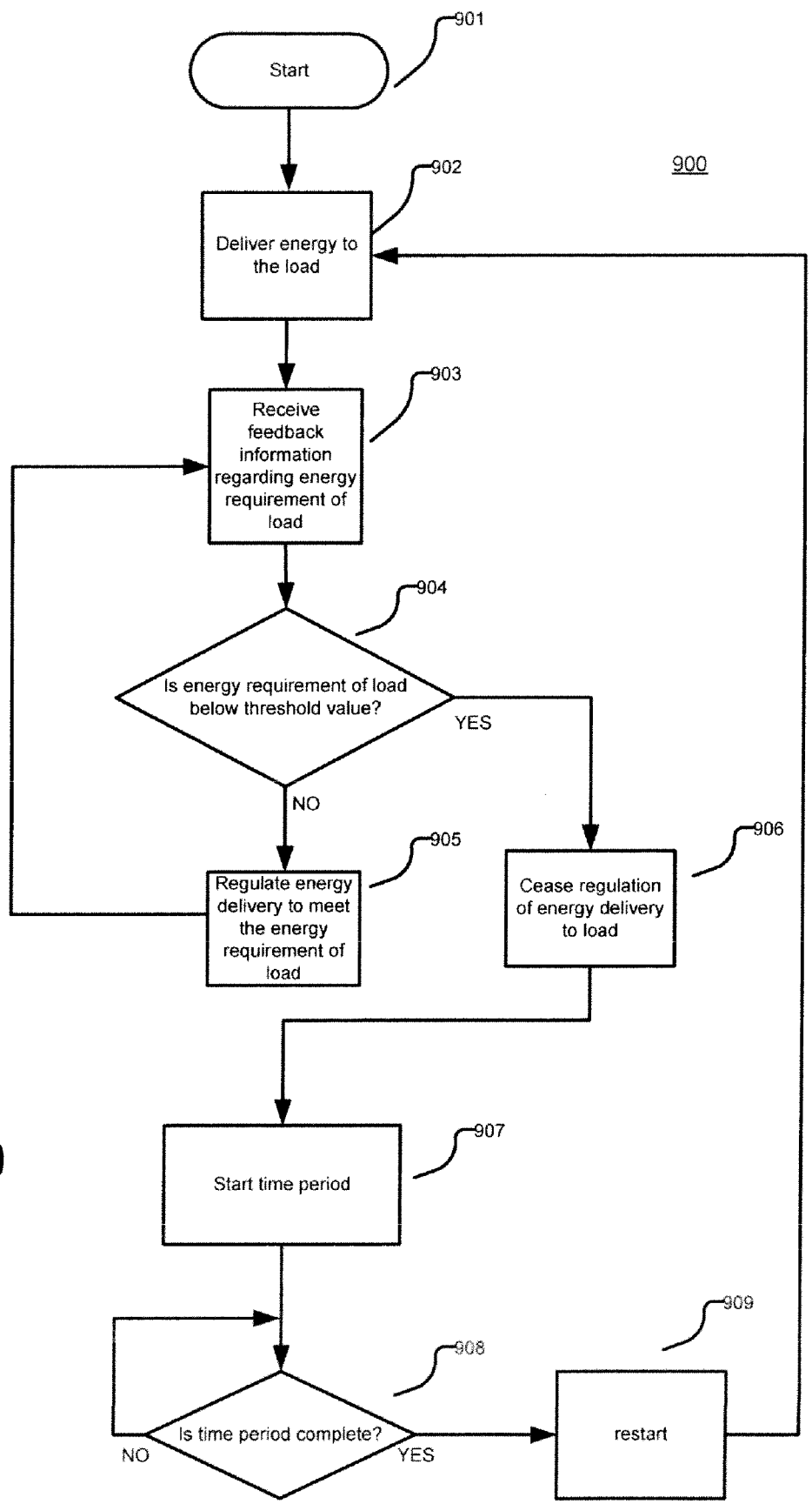
FIG. 9 is a flowchart illustrating an example method for reducing the energy consumption of a power converter under light or no load conditions by use of an unregulated dormant mode of operation in accordance with the teachings of the present invention.

FIG. 9 shows generally a flowchart 900 describing one example method of implementing an unregulated dormant mode of operation in a power converter in accordance with the present invention. As shown in the example, the power converter starts up in block 901 and energy is delivered to the load in block 902. In block 903, feedback information is received regarding the energy requirement of the load and in block 904, it is decided whether the energy requirement of the load is below a threshold value, which would indicate a light load/no-load condition. If not, energy delivery is regulated in block 905 and again feedback information is received in block 903. If however, in block 904 it is decided that the energy requirement of the load is below a threshold value, which would indicate a light load/no-load condition, in block 906 regulation of energy delivery is ceased, and in block 907 a time period of unregulated dormant mode is started. In either blocks 906 or 907, unnecessary circuit blocks are powered down so as to reduce energy consumption during the time period of unregulated dormant mode. In block 908 it is decided whether the time period of unregulated dormant mode is complete. When it is, the power converter is restarted in block 909 and then returns to block 902 where energy is delivered to the load. It is appreciated that in one example, block 909 could be eliminated if a YES decision in block 908 was connected directly to block 901 where the initial start up of the power converter is undertaken. However, the presence of block 909 allows for a different start up mode when the period of unregulated dormant mode operation is complete which could include for example starting up in a lower energy consumption state than the normal start up of the power supply in order to check for the presence of a light or no-load condition without all of the control circuit blocks being active for example and therefore reducing energy consumption even further.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A control circuit for use in a power converter, comprising:
   a drive signal generator coupled to generate a drive signal to control switching of a power switch to be coupled to the control circuit to regulate a flow of energy to a power converter output in response to an energy requirement of one or more loads to be coupled to the power converter output; and
   an unregulated dormant mode control circuit coupled to render dormant the drive signal generator thereby ceasing the regulation of the flow of energy to the power converter output by the drive signal generator when the energy requirement of the one or more loads falls below a threshold, the drive signal generator coupled to be unresponsive to changes in the energy requirements of the one or more loads when dormant, the unregulated dormant mode control circuit coupled to power up the drive signal generator after a period of time has elapsed, the drive signal generator coupled to again be responsive to changes in the energy requirement of the one or more loads after the period of time has elapsed.

2. The control circuit of claim 1 wherein the energy requirements of the one or more loads is determined in response to a feedback signal coupled to be received by the control circuit.

3. The control circuit of claim 2 wherein the energy requirements of the one or more loads is determined in response to a magnitude of the feedback signal coupled to be received by the control circuit.

4. The control circuit of claim 3 wherein the magnitude of the feedback signal is a voltage value.

5. The control circuit of claim 3 wherein the magnitude of the feedback signal is a current value.

6. The control circuit of claim 1 wherein the energy requirements of the one or more loads is determined in response to a switching frequency of the drive signal.

7. The control circuit of claim 1 wherein the power converter is a flyback converter.

8. The control circuit of claim 1 wherein the period of time is determined by a capacitor to be coupled to the control circuit.

9. The control circuit of claim 8 wherein the capacitor to be coupled to the control circuit comprises an external bypass capacitor for the control circuit.

10. The control circuit of claim 8 further comprising a regulator circuit to be coupled to charge the capacitor in response to the unregulated dormant mode control circuit, the regulator circuit coupled to not charge the capacitor when the energy requirements of the one or more loads falls below the threshold and to again charge the capacitor after the period of time has elapsed.

11. The control circuit of claim 1 wherein the power switch comprises a metal oxide semiconductor field effect transistor (MOSFET).

12. The control circuit of claim 1 wherein the power switch comprises a bipolar transistor.

13. The control circuit of claim 1 wherein the power switch is coupled to regulate the flow of energy to the power converter output through an energy transfer element and the energy transfer element comprises an isolated output winding, wherein one of the one or more loads is coupled to the isolated output winding.

14. The control circuit of claim 13 wherein said one of the one or more loads comprises a preload impedance and a load coupled to output terminals of the power converter.

15. The control circuit of claim 1 wherein the power switch is coupled to regulate the flow of energy to the power converter output through an energy transfer element and the energy transfer element comprises a non-isolated sense winding, wherein one of the one or more loads is coupled to the non-isolated sense winding.

16. The control circuit of claim 1 wherein the power switch is coupled to regulate the flow of energy to the power converter output through an energy transfer element and the energy transfer element comprises a non-isolated bias winding, wherein one of the one or more loads is coupled to the non-isolated bias winding.

17. The control circuit of claim 1 wherein the power switch is coupled to regulate the flow of energy to the power converter output through an energy transfer element and the energy transfer element comprises an isolated output winding and a non-isolated bias winding, wherein one of the one or more loads is coupled to the isolated output winding and an other one of the one or more loads is coupled to the non-isolated bias winding.

18. The control circuit of claim 1 wherein the power switch is coupled to regulate the flow of energy to the power converter output through an energy transfer element and the energy transfer element comprises a non-isolated output winding, wherein one of the one or more loads comprises a combined sensing and bias load coupled to the non-isolated output winding.

19. The control circuit of claim 1 wherein the power switch is coupled to regulate the flow of energy to the power converter output through an energy transfer element and the energy transfer element comprises an isolated output winding and a non-isolated output winding, wherein one of the one or more loads is coupled to the isolated output winding and an other one of the loads comprises a combined sensing and bias load coupled to the non-isolated output winding.

20. A method for controlling an output of a power converter, comprising:
   generating a drive signal with a drive signal generator to regulate a flow of energy to one or more loads coupled to an output of the power converter in response to an energy requirement of the one or more loads;
   rendering dormant the drive signal generator to cease for a period of time the regulation of energy flow to the one or more loads when the energy requirement of the one or more loads falls below a threshold value;
   not responding to the energy requirement of the one or more loads during the period of time; and
   powering up the drive signal generator to resume after the period of time has elapsed the regulation of energy flow to the one or more loads.

21. The method of claim 20 wherein one of the one or more loads is a sensing circuit coupled to the power converter output.

22. The method of claim 20 wherein one of the one or more loads is a combined sense and bias circuit coupled to one of the power converter output.

23. The method of claim 20 wherein one of the one or more loads is a preload impedance in combination with a load coupled to output terminals of the power converter.

24. The method of claim 23 wherein rendering dormant the drive signal generator to cease for the period of time the regulation of energy flow to the one or more loads comprises ceasing the flow of energy when energy requirements of the preload impedance in combination with the load falls below the threshold value.

25. The method of claim 20 wherein one of the one or more loads is coupled to output terminals of the power converter.

26. The method of claim 25 wherein rendering dormant the drive signal generator to cease for the period of time the regulation of energy flow to the one or more loads comprises ceasing the flow of energy when the energy requirement of the one of the one or more loads that is coupled to the output terminals of the power converter falls below the threshold value.

27. A control circuit for use in a power converter, comprising:
   a feedback circuit coupled to detect an energy requirement of one or more loads to be coupled to the power converter output;
   a drive signal generator coupled to generate a drive signal to control switching of a power switch to be coupled to the control circuit to regulate a flow of energy to the power converter output in response to the feedback circuit;
   a timer coupled to determine a time period in response to the feedback circuit indicating that the energy requirement of the one or more loads has fallen below a threshold; and
   an unregulated dormant mode control circuit coupled to the timer and coupled to render dormant the feedback circuit and the drive signal generator during the time period thereby causing regulation of the flow of energy to the power converter output to cease, the unregulated dormant mode control circuit further coupled to power up the feedback circuit and the drive signal generator after the time period has elapsed.

28. The control circuit of claim 27 wherein the drive signal generator and feedback circuit are coupled to be unresponsive to changes in the energy requirement of the one or more loads when dormant and again are responsive to changes in the energy requirements of the one or more loads after the time period has elapsed.

29. The control circuit of claim 27 wherein the unregulated dormant mode control circuit comprises a comparator coupled to the timer and a latch.

30. The control circuit of claim 27 wherein the unregulated dormant mode control circuit comprises a counter coupled to an oscillator and the feedback circuit to determine when the feedback circuit indicates that the energy requirement of the one or more loads has fallen below a threshold.

31. The control circuit of claim 27 the timer comprises an external bypass capacitor coupled to the control circuit.

32. A control circuit for use in a power converter, comprising:
   a feedback circuit coupled to detect an energy requirement of one or more loads to be coupled to the power converter output;
   a drive signal generator coupled to generate a drive signal to control switching of a power switch to be coupled to the control circuit to regulate a flow of energy to the power converter output in response to the feedback circuit;
   a regulator circuit to be coupled to charge a capacitor, the capacitor to determine a time period, the regulator circuit coupled to not charge the capacitor in response to the feedback circuit indicating that the energy requirement of the one or more loads has fallen below a threshold and to again charge the capacitor after the time period has elapsed; and
   an unregulated dormant mode control circuit coupled to render dormant the feedback circuit, the regulator circuit and the drive signal generator during the time period thereby causing regulation of the flow of energy to the power converter output to cease, the unregulated dormant mode control circuit further coupled to power up the feedback circuit, the regulator and the drive signal generator after the time period has elapsed.

33. The control circuit of claim 32 wherein the unregulated dormant mode control circuit comprises a comparator coupled to the capacitor and a latch.

34. The control circuit of claim 32 wherein the unregulated dormant mode control circuit comprises a counter coupled to an oscillator and the feedback circuit to determine when the feedback circuit indicates that the energy requirement of the one or more loads has fallen below a threshold.

35. The control circuit of claim 32 wherein the drive signal generator, regulator circuit and feedback circuit are coupled to be unresponsive to changes in the energy requirement of the one or more loads when dormant and again are responsive to changes in the energy requirements of the one or more loads after the time period has elapsed.

36. The control circuit of claim 32 wherein the capacitor comprises an external bypass capacitor to be coupled to the control circuit.

* * * * *